(12) United States Patent
Jang

(10) Patent No.: US 10,219,424 B2
(45) Date of Patent: Mar. 5, 2019

(54) METHOD FOR MANUFACTURING SEED ATTACHMENT MULCHING MATERIAL TO WHICH DIFFERENT TYPES OF PLANT SEEDS ARE ATTACHED, AND SEED ATTACHMENT MULCHING MATERIAL

(71) Applicant: JANG JADONGHWA., CO., LTD., Cheongju-si, Chungcheongbuk-do (KR)

(72) Inventor: Jae Su Jang, Cheongju-si (KR)

(73) Assignee: JANG JADONGHWA., CO., LTD., Cheongju-si, Chungcheongbuk-Do (KR)

( * ) Notice: Subject to any disclaimer, the term of this patent is extended or adjusted under 35 U.S.C. 154(b) by 296 days.

(21) Appl. No.: 14/908,761

(22) PCT Filed: Oct. 28, 2013

(86) PCT No.: PCT/KR2013/009623
§ 371 (c)(1),
(2) Date: Jan. 29, 2016

(87) PCT Pub. No.: WO2015/016425
PCT Pub. Date: Feb. 5, 2015

(65) Prior Publication Data
US 2016/0183448 A1    Jun. 30, 2016

(30) Foreign Application Priority Data

Jul. 31, 2013 (KR) .......................... 10-2013-0090729

(51) Int. Cl.
*A01C 1/04* (2006.01)

(52) U.S. Cl.
CPC ................. *A01C 1/04* (2013.01); *A01C 1/044* (2013.01)

(58) Field of Classification Search
CPC ........... A01C 1/04; A01C 1/042; A01C 1/044; A01C 1/046; A01C 2001/048; A01C 7/18; A01C 7/08; A01C 7/12
See application file for complete search history.

(56) References Cited

U.S. PATENT DOCUMENTS

| | | | | |
|---|---|---|---|---|
| 2003/0106258 A1* | 6/2003 | Keller | .................... | A01C 7/042 47/1.01 P |
| 2008/0009962 A1* | 1/2008 | Hood | ........................ | A01C 1/00 700/213 |
| 2012/0036772 A1* | 2/2012 | Kennedy | ................ | A01C 1/044 47/56 |

FOREIGN PATENT DOCUMENTS

| | | |
|---|---|---|
| JP | 05-023014 A | 2/1993 |
| JP | 05-085208 U | 11/1993 |

(Continued)

OTHER PUBLICATIONS

WO 2009/006733 (Year: 2009).*

*Primary Examiner* — Thanh Pham
(74) *Attorney, Agent, or Firm* — Rabin & Berdo, P.C.

(57) ABSTRACT

The present invention relates to a method for manufacturing a seed attachment mulching material, comprising the steps of: preparing different types of seeds to be attached to a mulching material; setting a seed attachment region; designating a seed to be attached according to a set region; inputting a seed to be attached to the set region; supplying a seed to be attached; attaching seeds by regions; and packing a mulching material after completing the seed attachment, and a seed attachment mulching material to which different types of plant seeds are attached, wherein a natural mulching material or a biodegradable film mulching material is used, a seed attachment region is set, different types of seeds are separated from each other at predetermined intervals and attached to the set region, and the (Continued)

seed-attached mulching material is formed to be roll-type or foldable, thereby facilitating spreading and sowing on the plant cultivation land.

3 Claims, 5 Drawing Sheets

(56) References Cited

FOREIGN PATENT DOCUMENTS

| | | |
|---|---|---|
| JP | 2008-148681 A | 7/2008 |
| KR | 10-2001-0084250 A | 9/2001 |
| KR | 10-0511453 B1 | 8/2005 |
| KR | 20-0403118 Y1 | 12/2005 |
| KR | 10-0963693 B1 | 6/2010 |

* cited by examiner

METHOD FOR MANUFACTURING SEED ATTACHMENT MULCHING MATERIAL TO WHICH DIFFERENT TYPES OF PLANT SEEDS ARE ATTACHED, AND SEED ATTACHMENT MULCHING MATERIAL

TECHNICAL FIELD

The present invention relates to a technique of attaching different types of plant seeds to one mulching material and supplying it, a method for manufacturing a seed attachment mulching material, allowing a specific pattern to be formed in a growth region, while plants sowed by the mulching material to which different types of seeds are attached grow, and a seed attachment material. More specifically, the present invention relates to a method for manufacturing a seed attachment mulching material to which different types of plant seeds are attached, allowing different types of at least one plant seed to be attached to a mulching material and sowed on the plant cultivation land, and also allowing to visibly recognize a pattern shown due to differences in types of plants, as different types of plant seeds attached to sowing regions germinate and grow, by designating sowing regions with a specific pattern in a mulching material to which seeds are attached, and attaching different seeds to each sowing region, and a seed attachment mulching material.

BACKGROUND ART

In supplying and sowing plant seeds, techniques of supplying and sowing different types of seeds are widely known that conventional seed stores or distributors supply to users a set of at least one seed contained in each bag according to the type, as illustrated in FIG. 1, or supply to users a combination of at least one seed contained in one bag, and a person supplied with the seeds takes out the seeds from the bag and sows the seeds on the plant cultivation land.

According to the above sowing technique, different types of seeds are supplied as a set. However, it is difficult to sow different types of seeds in designated regions on the plant cultivation land and to form specific patterns while the plants grow. Further, it is difficult to sow seeds since the seeds should be manually sowed one by one.

Also, the sowing technique is generally known of attaching seeds to a mulching material in order to maintain the soil surface temperature at a predetermined value so that plant seeds easily germinate, inhibit the generation of weeds, and simplify the sowing process.

As the conventional sowing technique, Korean Utility Model Registration No. 20-0403118 (Dec. 8, 2005) discloses a seed-attached mulching material for direct sowing. As illustrated in FIG. 2, this technique relates to forming natural cotton with a predetermined thickness, forming microperforations 200 at predetermined intervals according to the properties of crops to be sowed, in a mulching film 100 formed by layering glue, starch, and an enzyme material thereon, and attaching seeds 300 thereto using a natural adhesive, to directly spread on the land. This conventional art relates only to attaching seeds to the mulching film and spreading the mulching film on the land, but does not relate to attaching seeds by assorting the regions where the seeds are attached. Thus, the conventional technique cannot form a pattern by the types of plants to be grown.

As the conventional art of producing advertisement effect by using plants to be grown, Korean Patent No. 10-0511453 (Aug. 31, 2005) is disclosed. As illustrated in FIG. 3, this conventional art relates to an advertisement method in a rice paddy, of forming a space 600 indicating desired numbers, letters, and shapes without planting rice in the portion of numbers, letters, and shapes when planting rice 500 in the rice paddy 400, or planting and germinating barley only in a space 700 indicating numbers, letter, and shapes formed in the rice paddy 400 and forming the numbers, letters, and shapes after harvesting rice. This conventional technique relates only to sowing rice or barley only in a designated space in the rice paddy, but does not relate to simplifying a sowing process by attaching seeds to a mulching material and directly sowing the mulching material on the ground, and forming various patterns according to the types of plants germinated and grown from the attached seeds.

Also, as the conventional art of forming a pattern by plants to be grown, Korean Patent No. 10-0963693 (Jun. 16, 2010) is disclosed. As illustrated in FIG. 4, this conventional art relates to a method for cultivating plants in a rice paddy for advertisement and promotion, of planting colored rice 900 and green rice 1000 in a space predesigned with advertisement and promotion phrases in the rice paddy 800. Thus, the conventional art relates only to promoting a specific image by sowing different types of plants in a predetermined designed space, but does not relate to simplifying a sowing process by attaching seeds to a mulching material and directly sowing the mulching material on the ground, and forming various patterns according to the types of plants germinated and grown from the seeds attached to the mulching material.

DETAILED DESCRIPTION OF THE INVENTION

Technical Subject

The present invention aims to provide a method for manufacturing a seed attachment mulching material to which different types of plant seeds are attached and a seed attachment mulching material, which were not implemented in the conventional art. The present invention is to provide a method for manufacturing a seed attachment mulching material to which different types of plant seeds are attached and a seed attachment mulching material, capable of growing different types of plants according to set regions by setting sowing regions of sowing seeds in a mulching material to which seeds are attached, attaching different types of seeds to each set region, and sowing the seeds on the plan cultivation land, using the seed attachment mulching material, and also of visibly recognizing different patterns shown due to different types of plants while the sowed plants germinate and grow in each region.

Means for Solving Technical Subject

In order to achieve the above technical subject, a method for manufacturing a seed attachment mulching material to which different types of plant seeds are attached according to the present invention comprises: the step 20 of preparing different types of seeds to be attached to a mulching material; the step 30 of setting a seed attachment region in the mulching material, to which different types of seeds are attached; the step 40 of designating a seed to be attached according to the set region in the mulching material; the step 50 of inputting a file prepared by designating the set region and seed to be attached to the set region in the mulching material into a controller controlling the operation of a shut-off valve and the location movement of a hopper in a seed attachment device including a plurality of hoppers with a shut-off valve and the controller; the step 60 of supplying the seed to be attached to the set region to the hopper for supplying the seed; the step 70 of attaching different types of seeds stored in the hopper according to each region; and the step 80 of packing a mulching material in which seed attachment is terminated.

Also, the present invention aims to provide a seed attachment mulching material to which different types of plant seeds are attached, wherein a natural mulching material or a biodegradable film mulching material is used as the seed attachment mulching material, a seed attachment region is set, different types of seeds are separated from each other at predetermined intervals and attached to each set region, and the seed-attached mulching material is formed to be roll-type or foldable, thereby facilitating spreading and sowing on the plant cultivation land.

Also, the present invention aims to provide a seed attachment mulching material to which different types of plant seeds are attached, wherein the seed is attached by a seed attachment device, formed to mount a plurality of hoppers with a shut-off valve on a horizontal shaft, wherein the horizontal shaft is connected with a plurality of vertical shafts, include a mulching material installing platform, on which a mulching material is placed, in the lower part of the hopper, and a controller controlling the operation of the shut-off valve and the movement location of the hopper.

Effect of the Invention

The present invention produces effects of easily sowing different types of seeds in set regions in the plant cultivation land and efficiently cultivating different plants in a designated space, by supplying as a set a mulching material to which different seeds are attached.

Also, the present invention produces effects of efficiently possessing promotion effect which a plant cultivator intends to achieve by spreading a seed attachment mulching material on the plant cultivation land and forming a pattern while the plants grow, by providing the seed attachment mulching material to which the seeds are attached with a pattern on the plant cultivation land.

Also, the present invention produces effects of allowing a sowing process capable of accurately, easily and quickly forming a required pattern without designing or drawing a pattern to be implemented directly on the plant cultivation land, only by spreading a seed attachment mulching material which forms a pattern while plants grow, on the plant cultivation land, since the pattern is formed while plants grow.

Also, the present invention produces effects of allowing promotion effect with an object shape having a complicated shape, and achieving aesthetic beauty in combination with various colors, since various patterns may be formed on the plant cultivation land while plants grow.

BEST MODE FOR CARRYING OUT THE INVENTION

Hereinafter, the present invention is described in detail with reference to the drawings.

Figure 1:
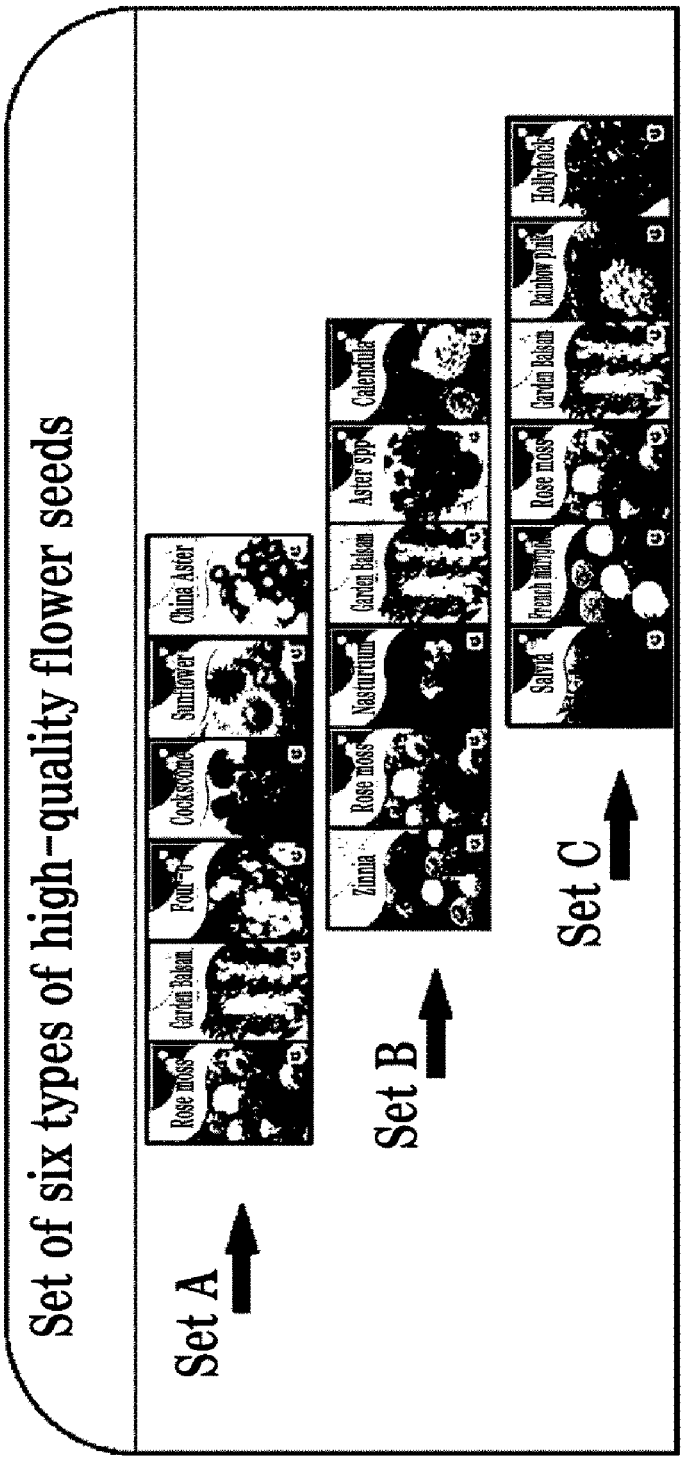
FIG. 1 is a view illustrating a conventional set supply of seeds according to the conventional art.
Figure 2:
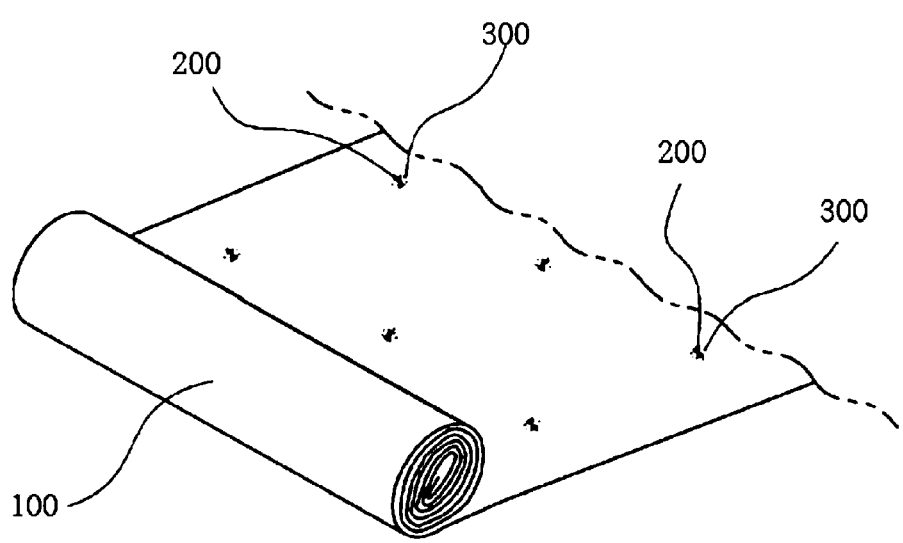
FIG. 2 is a view illustrating a seed attachment mulching material according to the conventional art.
Figure 3:
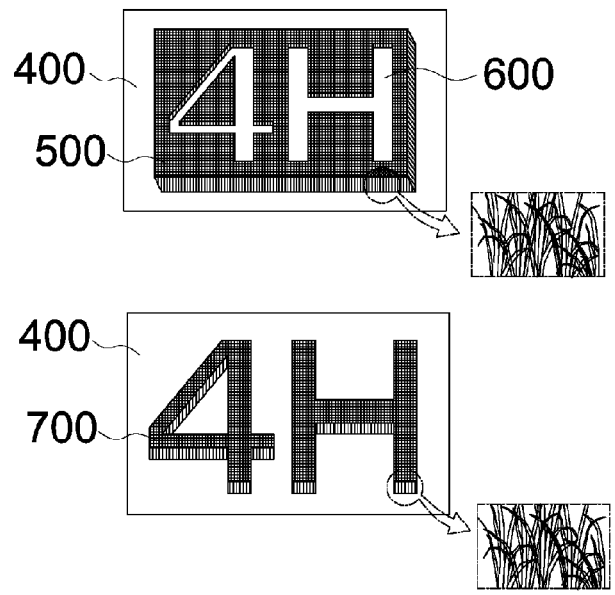
FIGS. 3 and 4 are views illustrating pattern formations on the plant cultivation land according to the conventional art.
Figure 4:
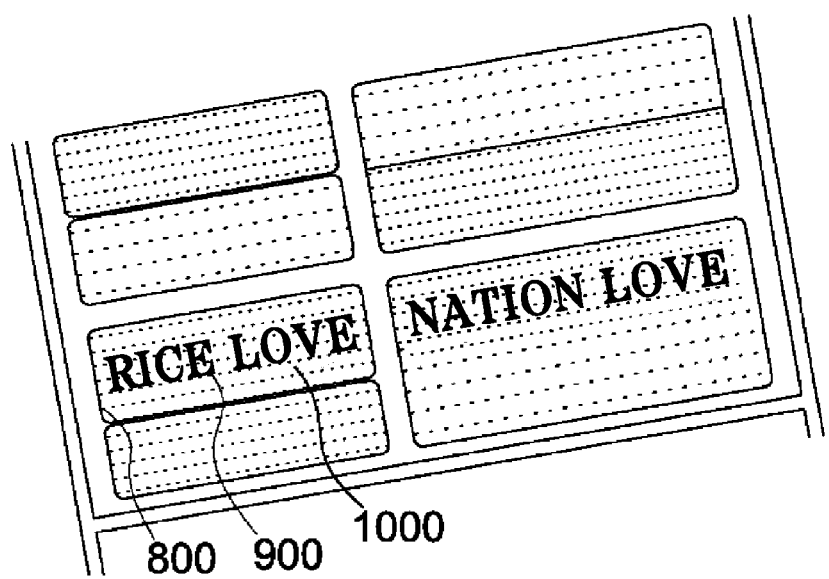
Figure 5:
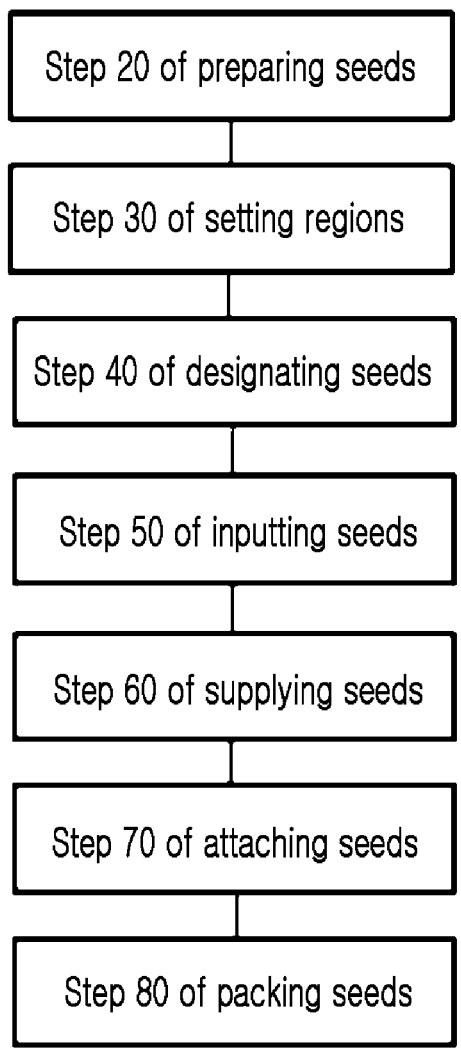
FIG. 5 is a block diagram illustrating a method for manufacturing a seed attachment mulching material to which different types of plant seeds are attached.

As illustrated in FIG. 5, a method for manufacturing a seed attachment mulching material to which different types of plant seeds are attached according to the present invention comprises: the step 20 of preparing different types of seeds to be attached to a mulching material; the step 30 of setting a seed attachment region in the mulching material, to which different types of seeds are attached; the step 40 of designating a seed to be attached according to the set region in the mulching material; the step 50 of inputting a file prepared by designating the set region and seed to be attached to the set region in the mulching material into a controller controlling the operation of a shut-off valve and the location movement of a hopper in a seed attachment device including a plurality of hoppers with a shut-off valve and the controller; the step 60 of supplying a seed to be attached to the set region to the hopper for supplying the seed; the step 70 of attaching different types of seeds stored in the hopper according to each region; and the step 80 of packing a mulching material in which seed attachment is terminated.

In step 20 of preparing seeds, which is a step of selecting the types of seeds to be attached to a mulching material and cultivated on the plant cultivation land and preparing the seeds, the types of plants a user arbitrarily selects or being designated are selected and prepared.

In step 30 of setting the region, the pattern the user requires is prepared by separation or connection with predetermined regions, lines, or dots, using drawing preparation software, such as CAD or illustrator, etc. For example, when a pattern is prepared in a predetermined region, the design of letters or figures is distinguished by the regions while seeds are sowed and grown, as illustrated in FIG. 5.

In step 40 of designating the seeds, which is a step of designating seeds to be attached for each region with respect to the regions set in the step 30 of setting the regions, it is preferable to distinguish each region with color or symbol and designate seeds to be attached to a mulching material according to colors.

In step 50 of inputting the seeds, a file prepared by designating seeds according to each region in step 40 of designating the seeds is inputted to a controller 10 controlling a seed attachment device A. For example, the attachment of the seeds designated according to the regions to a mulching material 1 is performed by inputting the formed design file into the controller 10 in the seed attachment device of computer, and the controller 10 reading the set regions and controlling the seed attachment device A.

In step 60 of supplying the seeds, which is a step of containing the seeds prepared in the step of preparing the seeds in a hopper 2 for storing seeds included in the seed attachment device A, so that the seeds are to be attached to the mulching material 1 according to the set regions, different seeds are contained in at least one hopper 2 and supplied to the mulching material 1.

In step 70 of attaching the seeds, which is a step of attaching the seeds to the mulching material according to the designated regions, the controller 10 controls a seed shut-off valve included in the hopper 2, such that the seeds stored in the hopper are to be attached to the designated regions, thereby supplying and attaching the designated seeds to each region. Further, a user selects seed attachment locations in consideration of types of seeds such that the seeds are attached at predetermined intervals, and the operation of the seed attachment device A is to be automatically controlled.

In step 80 of packing the mulching material, a mulching material to which different types of seeds are attached is packed to form a roll or foldable type, which facilitates sowing the mulching material on the plant cultivation land mechanically or manually.

Figure 6:
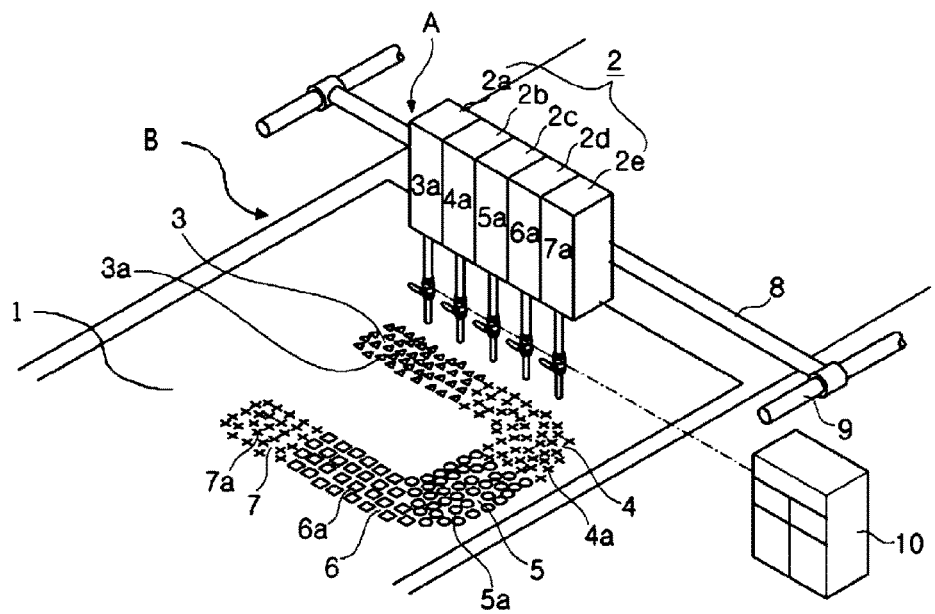
FIG. 6 is a view conceptually illustrating a method for manufacturing a seed attachment mulching material to which different types of plant seeds are attached and a seed attachment device of a seed attachment mulching material according to the present invention.

As illustrated in FIG. 6, the seed attachment device A is formed to mount a plurality of hoppers 2 with a shut-off valve on a horizontal shaft 8, wherein the horizontal shaft 8 is connected with a plurality of vertical shafts 9, include a mulching material installing platform B, on which a mulching material 1 is placed, in the lower part of the hopper 2, and comprise a controller 10 controlling the operation of the shut-off valve and the movement location of the hopper 2.

Figure 7:
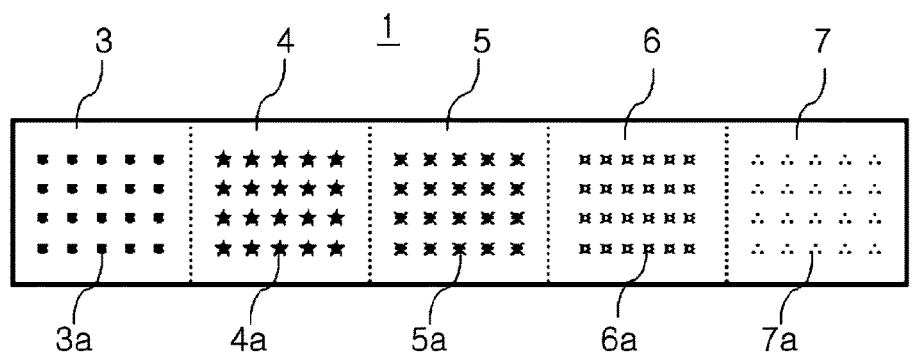
FIG. 7 is a view conceptually illustrating a seed attachment mulching material to which different types of plant seeds are attached according to the present invention.

A process of attaching seeds to the mulching material 1 by the seed attachment device A is explained, as an example. As illustrated in FIGS. 6 and 7, when the region of the mulching material 1 to which seeds are attached is assorted into five regions and different seeds are attached to each region, the controller 10 opens and closes the shut-off valve of the first hopper 2a at predetermined intervals such that a first seed 3a is attached to a first region 3.

When the first seed 3a stored in the first hopper 2a is supplied to the first region 3 according to the opening and closing of the shut-off valve, the first seed 3a is to be attached to the first region 3 at predetermined intervals by transporting the hopper 2 from left to right (or from right to left), from front to back (or from back to front) of the mulching material 1 within the range of the first region 3 through a horizontal shaft 8 and a vertical shaft 9 at a predetermined speed.

Here, as the technique of attaching the seeds to the mulching material 1, widely known general techniques that can be carried out by anyone in the art are used. Thus, the specific constitution and explanation thereon are omitted.

Next, the controller 10 opens and closes the shut-off valve of a second hopper 2b at predetermined intervals such that a second seed 4a is attached to a second region 4. When the second seed 4a stored in the second hopper 2b is supplied to the second region 4 according to the opening and closing of the shut-off valve, the second seed 4a is to be attached to the second region 4 at predetermined intervals by transporting the hopper 2 from left to right (or from right to left), from front to back (or from back to front) of the mulching material 1 within the range of the second region 4 through the horizontal shaft 8 and the vertical shaft 9 at a predetermined speed.

Thereafter, the controller 10 opens and closes only the shut-off valve of a third hopper 2c at predetermined intervals such that a third seed 5a is attached to a third region 5. When the third seed 5a stored in the third hopper 2c is supplied to the third region 5 according to the opening and closing of the shut-off valve, the third seed 5a is to be attached to the third region 5 at predetermined intervals by transporting the hopper 2 from left to right (or from right to left), from front to back (or from back to front) of the mulching material 1 within the range of the third region 5 through the horizontal shaft 8 and the vertical shaft 9 at a predetermined speed.

Thereafter, the controller 10 opens and closes only the shut-off valve of a fourth hopper 2d at predetermined intervals such that a fourth seed 6a is attached to a fourth region 6. When the fourth seed 6a stored in the fourth hopper 2d is supplied to the fourth region 6 according to the opening and closing of the shut-off valve, the fourth seed 6a is to be attached to the fourth region 6 at predetermined intervals by transporting the hopper 2 from left to right (or from right to left), from front to back (or from back to front) of the mulching material 1 within the range of the fourth region 6 through the horizontal shaft 8 and the vertical shaft 9 at a predetermined speed.

Thereafter, the controller 10 opens and closes only the shut-off valve of a fifth hopper 2e at predetermined intervals such that a fifth seed 7a is attached to a fifth region 7. When the fifth seed 7a stored in the fifth hopper 2e is supplied to the fifth region 7 according to the opening and closing of the shut-off valve, the fifth seed 7a is to be attached to the fifth region 7 at predetermined intervals by transporting the hopper 2 from left to right (or from right to left), from front to back (or from back to front) of the mulching material 1 within the range of the fifth region 7 through the horizontal shaft 8 and the vertical shaft 9 at a predetermined speed.

As such, when all of the seeds are attached to the seed attachment regions of first to fifth regions set in the mulching material 1, the seed attachment device is returned to the original position so as to perform another work.

The above embodiment describes that the controller 10 controls opening and closing of each of the seed shut-off valves included in the hopper 2, but the present invention is not limited thereto. Of course, a plurality of shut-off valves may be operated according to regions to be set and attachment state of seeds.

Also, as a seed attachment mulching material according to the present invention, a natural mulching material or a biodegradable film mulching material that can be unlimitedly used by anyone may be used. Further, a seed attachment region is set in the mulching material, different types of seeds are separated from each other at predetermined intervals and attached to each set region, and the seed-attached mulching material is formed to be roll-type or foldable, thereby facilitating spreading and sowing on the plant cultivation land.

As illustrated in FIG. 6, seeds to be attached may be attached to a set region with a specific pattern in the seed attachment mulching material. Also, as illustrated in FIG. 7, a region to which seeds are attached may be set to be assorted in a longitudinal direction in the mulching material with a predetermined length.

Further, the first seed 3a rose moss in the first region 3, the second seed 4a garden balsam in the second region 4, the third seed 5a *Mirabilis jalapa* in the third region 5, the fourth seed 6a cockscome in the fourth region 6, and the fifth seed 7a sunflower in the fifth region 7 are separated from each other and attached at predetermined intervals. The seed attachment mulching material is formed by rolling the mulching material in a roll type or folding the region separation line.

What is claimed is:
1. A method for manufacturing a seed attachment mulching material, comprising the steps of:
   preparing different types of seeds to be attached to a mulching material;
   setting a plurality of seed attachment regions in the mulching material, to which the different types of seeds are respectively attached based on the seed type;

designating the different types of seeds, to be respectively attached to the plurality of seed attachment regions in the mulching material based on the seed type;

inputting a file prepared by the setting a plurality of seed attachment regions and the designating the different types of seeds into a controller;

using the controller to control operation of shut-off valves and location movement of hoppers in a seed attachment device, wherein each of the hoppers includes one of the shut-off valves;

moving the hoppers by the controller such that a predetermined one of the hoppers, which stores a plurality of seeds of a predetermined type, is moved to a corresponding region of the plurality of seed attachment regions and is transported in left to right, right to left, front to back, or back to front direction within a range of the corresponding region;

opening and closing the shut-off valve of the predetermined one of the hoppers during transporting within the range of the corresponding region, such that the plurality of seeds of the predetermined type fall down from the predetermined one of the hoppers onto multiple spots of the corresponding region of the mulching material in accordance with the transporting of the predetermined one of the hoppers within the range of the corresponding region;

attaching the different types of seeds stored in the hoppers according to each of the plurality of seed attachment regions based on the seed type; and packing a mulching material in which seed attachment is terminated.

2. The method of claim 1, wherein the different types of seeds attached to the plurality of seed attachment regions collectively form a predetermined shape on the mulching material.

3. The method of claim 1, wherein the plurality of seeds of the predetermined type fall down from the predetermined one of the hoppers onto the multiple spots on a top surface of the corresponding region of the mulching material such that the plurality of seeds are attached to the top surface while being exposed to an exterior.

* * * * *